United States Patent
Huang et al.

(10) Patent No.: US 9,980,304 B2
(45) Date of Patent: May 22, 2018

(54) ADAPTIVE ON-DEMAND TETHERING

(71) Applicant: GOOGLE INC., Mountain View, CA (US)

(72) Inventors: Jonathan Huang, Sunnyvale, CA (US); Paul Stewart, Los Altos, CA (US)

(73) Assignee: Google LLC, Mountain View, CA (US)

( * ) Notice: Subject to any disclaimer, the term of this patent is extended or adjusted under 35 U.S.C. 154(b) by 204 days.

(21) Appl. No.: 14/678,872

(22) Filed: Apr. 3, 2015

(65) Prior Publication Data
US 2016/0295622 A1 Oct. 6, 2016

(51) Int. Cl.
| | |
|---|---|
| *H04W 76/02* | (2009.01) |
| *H04W 4/00* | (2009.01) |
| *H04W 12/06* | (2009.01) |
| *H04W 24/10* | (2009.01) |
| *H04W 76/06* | (2009.01) |

(Continued)

(52) U.S. Cl.
CPC ......... *H04W 76/023* (2013.01); *H04L 41/00* (2013.01); *H04L 43/00* (2013.01); *H04W 4/008* (2013.01); *H04W 12/06* (2013.01); *H04W 24/00* (2013.01); *H04W 24/10* (2013.01); *H04W 48/18* (2013.01); *H04W 76/06* (2013.01); *H04W 84/18* (2013.01);

(Continued)

(58) Field of Classification Search
None
See application file for complete search history.

(56) References Cited

U.S. PATENT DOCUMENTS

| | | | |
|---|---|---|---|
| 5,689,667 | A | 11/1997 | Kurtenbach |
| 5,943,039 | A | 8/1999 | Anderson et al. |

(Continued)

FOREIGN PATENT DOCUMENTS

| | | |
|---|---|---|
| CN | 1437379 A | 8/2003 |
| CN | 101150793 A | 3/2008 |

(Continued)

OTHER PUBLICATIONS

"WiFi Tethering", <http://www.appbrain.com/app/wifi-tethering/og.android.tether>, Open Garden Inc., visited Sep. 16, 2013, 1 pg.

(Continued)

*Primary Examiner* — Saba Tsegaye
(74) *Attorney, Agent, or Firm* — McDermott Will & Emery LLP

(57) ABSTRACT

A device that implements adaptive on-demand tethering may include at least one processor circuit. The at least one processor circuit may be configured to monitor at least a first connection quality value associated with a first network connection of the device to a network. The at least one processor circuit may be further configured to receive information regarding a second connection quality value associated with a second network connection of another device. The at least one processor circuit may be further configured to initiate a tethering connection with the another device based at least in part on a comparison of the first connection quality value and the second connection quality value. The at least one processor circuit may be further configured to connect to the network through the second network connection of the another device via the tethering connection based at least in part on the comparison.

20 Claims, 5 Drawing Sheets

(51) Int. Cl.

| | | |
|---|---|---|
| *H04L 12/26* | (2006.01) | |
| *H04W 24/00* | (2009.01) | |
| *H04W 48/18* | (2009.01) | |
| *H04W 84/18* | (2009.01) | |
| *H04W 88/04* | (2009.01) | |
| *H04L 12/24* | (2006.01) | |
| *H04W 84/20* | (2009.01) | |
| *H04W 88/06* | (2009.01) | |
| *H04W 48/12* | (2009.01) | |

(52) U.S. Cl.
CPC .......... *H04W 88/04* (2013.01); *H04W 48/12* (2013.01); *H04W 84/20* (2013.01); *H04W 88/06* (2013.01)

(56) References Cited

U.S. PATENT DOCUMENTS

| | | | |
|---|---|---|---|
| 7,185,363 B1 | 2/2007 | Narin et al. | |
| 7,382,268 B2 | 6/2008 | Hartman | |
| 7,487,170 B2 | 2/2009 | Stevens | |
| 7,603,435 B2 | 10/2009 | Welingkar et al. | |
| 7,603,633 B2 | 10/2009 | Zhao et al. | |
| 7,657,594 B2 | 2/2010 | Banga et al. | |
| 7,697,942 B2 | 4/2010 | Stevens | |
| 7,865,964 B2 | 1/2011 | Narin et al. | |
| 8,077,153 B2 | 12/2011 | Benko et al. | |
| 8,181,122 B2 | 5/2012 | Davidson | |
| 8,526,885 B2 | 9/2013 | Lin et al. | |
| 8,793,758 B2 | 7/2014 | Raleigh et al. | |
| 9,277,578 B2 | 3/2016 | Guglielmi et al. | |
| 2003/0212800 A1 | 11/2003 | Jones | |
| 2004/0177276 A1 | 9/2004 | MacKinnon et al. | |
| 2006/0095865 A1 | 5/2006 | Rostom | |
| 2006/0258289 A1 | 11/2006 | Dua | |
| 2007/0008300 A1 | 1/2007 | Yang et al. | |
| 2007/0121541 A1 | 5/2007 | Matsuo | |
| 2007/0174788 A1 | 7/2007 | Ording | |
| 2007/0180392 A1 | 8/2007 | Russo | |
| 2007/0256029 A1 | 11/2007 | Maxwell | |
| 2008/0090520 A1 | 4/2008 | Camp et al. | |
| 2008/0095080 A1 | 4/2008 | Danzeisen et al. | |
| 2008/0113665 A1 | 5/2008 | Paas et al. | |
| 2008/0222569 A1 | 9/2008 | Champion et al. | |
| 2008/0313538 A1 | 12/2008 | Hudson | |
| 2008/0313569 A1 | 12/2008 | Aoki et al. | |
| 2009/0033633 A1 | 2/2009 | Newman et al. | |
| 2009/0037813 A1 | 2/2009 | Newman et al. | |
| 2009/0170432 A1 | 7/2009 | Lortz | |
| 2009/0192937 A1 | 7/2009 | Griffin et al. | |
| 2009/0260064 A1 | 10/2009 | McDowell et al. | |
| 2009/0327963 A1 | 12/2009 | Mouilleseaux et al. | |
| 2009/0327964 A1 | 12/2009 | Mouilieseaux et al. | |
| 2010/0073303 A1 | 3/2010 | Wu et al. | |
| 2010/0077447 A1 | 3/2010 | Dholakia et al. | |
| 2010/0144314 A1 | 6/2010 | Sherkin et al. | |
| 2010/0192102 A1 | 7/2010 | Chmielewski et al. | |
| 2010/0192103 A1 | 7/2010 | Cragun et al. | |
| 2010/0221999 A1 | 9/2010 | Braun et al. | |
| 2010/0251179 A1 | 9/2010 | Cragun et al. | |
| 2010/0251180 A1 | 9/2010 | Cragun et al. | |
| 2010/0299637 A1 | 11/2010 | Chmielewski et al. | |
| 2010/0299638 A1 | 11/2010 | Choi | |
| 2010/0306702 A1 | 12/2010 | Warner | |
| 2011/0016390 A1 | 1/2011 | Oh et al. | |
| 2011/0055760 A1 | 3/2011 | Drayton et al. | |
| 2011/0065384 A1 | 3/2011 | Cader et al. | |
| 2011/0069029 A1 | 3/2011 | Ryu et al. | |
| 2011/0074718 A1 | 3/2011 | Yeh et al. | |
| 2011/0113371 A1 | 5/2011 | Parker et al. | |
| 2011/0126009 A1 | 5/2011 | Camp, Jr. et al. | |
| 2011/0145445 A1 | 6/2011 | Malamant et al. | |
| 2011/0148796 A1 | 6/2011 | Hollemans et al. | |
| 2011/0171907 A1 | 7/2011 | Jolivet | |
| 2011/0231796 A1 | 9/2011 | Vigil | |
| 2011/0234503 A1 | 9/2011 | Fitzmaurice et al. | |
| 2011/0250909 A1 | 10/2011 | Mathias et al. | |
| 2011/0283001 A1 | 11/2011 | Jung et al. | |
| 2011/0294502 A1 | 12/2011 | Oerton | |
| 2011/0302643 A1 | 12/2011 | Pichna et al. | |
| 2012/0001858 A1 | 1/2012 | Matsuda et al. | |
| 2012/0026992 A1 | 2/2012 | Navda et al. | |
| 2012/0030070 A1 | 2/2012 | Keller et al. | |
| 2012/0036434 A1 | 2/2012 | Oberstein | |
| 2012/0056836 A1 | 3/2012 | Cha et al. | |
| 2012/0120934 A1* | 5/2012 | Cho | H04W 40/24 370/338 |
| 2012/0143978 A1 | 6/2012 | Coussemaeker et al. | |
| 2012/0144345 A1 | 6/2012 | Munter et al. | |
| 2012/0214413 A1 | 8/2012 | Rose et al. | |
| 2012/0240197 A1 | 9/2012 | Tran et al. | |
| 2012/0253974 A1 | 10/2012 | Haikonen et al. | |
| 2012/0254040 A1 | 10/2012 | Dixon et al. | |
| 2012/0254142 A1 | 10/2012 | Knowlton et al. | |
| 2012/0258658 A1 | 10/2012 | Matsuo | |
| 2012/0264375 A1 | 10/2012 | Shankaranarayanan | |
| 2012/0324067 A1 | 12/2012 | Hari et al. | |
| 2013/0016126 A1 | 1/2013 | Wang et al. | |
| 2013/0019175 A1 | 1/2013 | Kotler et al. | |
| 2013/0019205 A1 | 1/2013 | Gil et al. | |
| 2013/0029596 A1 | 1/2013 | Preston et al. | |
| 2013/0176232 A1 | 7/2013 | Waeller | |
| 2013/0237148 A1 | 9/2013 | McCann et al. | |
| 2013/0331028 A1 | 12/2013 | Kuehnel et al. | |
| 2013/0347073 A1 | 12/2013 | Bryksa et al. | |
| 2014/0004793 A1 | 1/2014 | Bandyopadhyay et al. | |
| 2014/0007209 A1 | 1/2014 | Zucker | |
| 2014/0071063 A1 | 3/2014 | Kuscher | |
| 2014/0071968 A1* | 3/2014 | Raniere | H04W 48/18 370/338 |
| 2014/0078089 A1 | 3/2014 | Lee et al. | |
| 2014/0080550 A1 | 3/2014 | Ino et al. | |
| 2014/0075388 A1 | 5/2014 | Kuscher | |
| 2014/0127992 A1 | 5/2014 | Kuscher et al. | |
| 2014/0127994 A1 | 5/2014 | Nightingale et al. | |
| 2014/0181500 A1 | 6/2014 | Mann et al. | |
| 2014/0188348 A1 | 7/2014 | Gautama et al. | |
| 2014/0254499 A1* | 9/2014 | Hassan | H04W 12/08 370/329 |
| 2015/0003432 A1 | 1/2015 | Tanaka | |
| 2015/0304800 A1* | 10/2015 | Son | H04B 7/24 455/41.2 |
| 2015/0351004 A1* | 12/2015 | Ko | H04W 4/008 455/411 |
| 2016/0007394 A1* | 1/2016 | Hassan | H04W 76/022 455/450 |
| 2016/0080894 A1 | 3/2016 | Lin et al. | |
| 2017/0187425 A1 | 6/2017 | Kuscher et al. | |

FOREIGN PATENT DOCUMENTS

| | | |
|---|---|---|
| CN | 101185007 A | 5/2008 |
| CN | 102144421 A | 8/2011 |
| CN | 102315996 A | 1/2012 |
| CN | 102347957 A | 2/2012 |
| CN | 102546753 A | 7/2012 |
| EP | 2432277 A1 | 3/2012 |
| EP | 2503826 | 9/2012 |
| JP | 2006-139615 A | 6/2006 |
| JP | 2009-100064 A | 5/2009 |
| JP | 2010-537561 A | 12/2010 |
| JP | 2011-146978 A | 7/2011 |
| JP | 2011-211471 A | 10/2011 |
| JP | 2012-511858 A | 5/2012 |
| KR | 10-2011-0040087 | 4/2011 |
| KR | 10-2012-0055661 | 5/2012 |
| KR | 10-2012-0118038 | 10/2012 |
| WO | WO-2006/062066 A1 | 6/2006 |
| WO | 2010/112064 A1 | 10/2010 |
| WO | WO-2010/126069 A1 | 11/2010 |
| WO | 2011/101852 A2 | 8/2011 |

(56) References Cited

FOREIGN PATENT DOCUMENTS

WO     WO-2012/0037690 A1     3/2012
WO     WO-2014/163965 A1     10/2014

OTHER PUBLICATIONS

"Barnacle Wifi Tether", <http://www.appbrain.com/app/barnacle-wifi-tether/net.szym.barnacle>, szym.net, visited Sep. 16, 2013, 1 pg.
"My Wi On Demand", <http://www.intelliborn.com/mywiondemand.html>, Intelliborn Corporation, visited Sep. 16, 2013, 1 pg.
Sharma, Ashish, et al., "Cool-Tether: Energy Efficient On-the-fly WiFi Hot-sports Using Mobile Phones", CoNEXT, Dec. 2009, 12 pgs.
Iglesias, Jesus, "Blue Car Tethering on Demand", Dec. 1, 2014, 2 pgs.
Rigney, et al., "Remote Authentication Dian in User Service (RADIUS)," Jun. 2000, retrieved from http://wftp3.itu.int/av-arch/jctve-site.
Japanese Office Action from Japanese Application No. 2015-539953, dated Feb. 7, 2017.
Chinese Office Action from Chinese Patent Application No. 201380065336.X, dated May 3, 2017.
Chinese Office Action from Chinese Application No. 201380063621.8, dated Apr. 25, 2017.
Chinese Office Action from Chinese Patent Application No. 201380065339.X, dated Jan. 9, 2018, 22 pages.
European Office Action from European Patent Application No. 13851939.2, dated Mar. 16, 2018, 7 pages.

* cited by examiner

ADAPTIVE ON-DEMAND TETHERING

TECHNICAL FIELD

The present description relates generally to tethering, including adaptive on-demand tethering.

BACKGROUND

A user may create a Wi-Fi hotspot on their mobile device to share the mobile device's connection to the Internet (e.g. a cellular Internet connection) with proximal devices, such as laptops, tablets, etc. However, configuring the mobile device to create the Wi-Fi hotspot, and the other devices to access the hotspot, may be tedious and/or time-consuming. The latency in configuring the devices may be disruptive to users.

SUMMARY

The disclosed subject matter relates to a computer-implemented method for adaptive on-demand tethering. The computer-implemented method includes connecting to a network via a first network connection. The computer-implemented method further includes monitoring at least a first attribute of the first network connection. The computer-implemented method further includes initiating a tethering connection with a proximal device based at least in part on the monitoring of the first attribute. The computer-implemented method further includes connecting to the network through a second network connection of the proximal device via the tethering connection based at least in part on the monitoring of the first attribute.

The disclosed subject matter also relates to a device that includes at least one processor circuit that is configured to monitor at least a first connection quality value associated with a first network connection of the device to a network. The at least one processor circuit is further configured to receive information regarding a second connection quality value associated with a second network connection of another device. The at least one processor circuit is further configured to initiate a tethering connection with the another device based at least in part on a comparison of the first connection quality value and the second connection quality value. The at least one processor circuit is further configured to connect to the network through the second network connection of the another device via the tethering connection based at least in part on the comparison.

The disclosed subject matter also relates to a non-transitory machine-readable medium embodying instructions that, when executed by a machine, cause the machine to perform a method that may include monitoring at least a connection quality value associated with a network connection to a network, wherein the network connection utilizes a first communication protocol. The method may further include broadcasting, utilizing a second communication protocol, information regarding the connection quality value. The method may further include receiving, in response to the broadcasting and via the second communication protocol, a request to initiate a tethering connection from a device. The method may further include establishing the tethering connection with the device. The method may further include connecting the device to the network through the network connection via the tethering connection.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
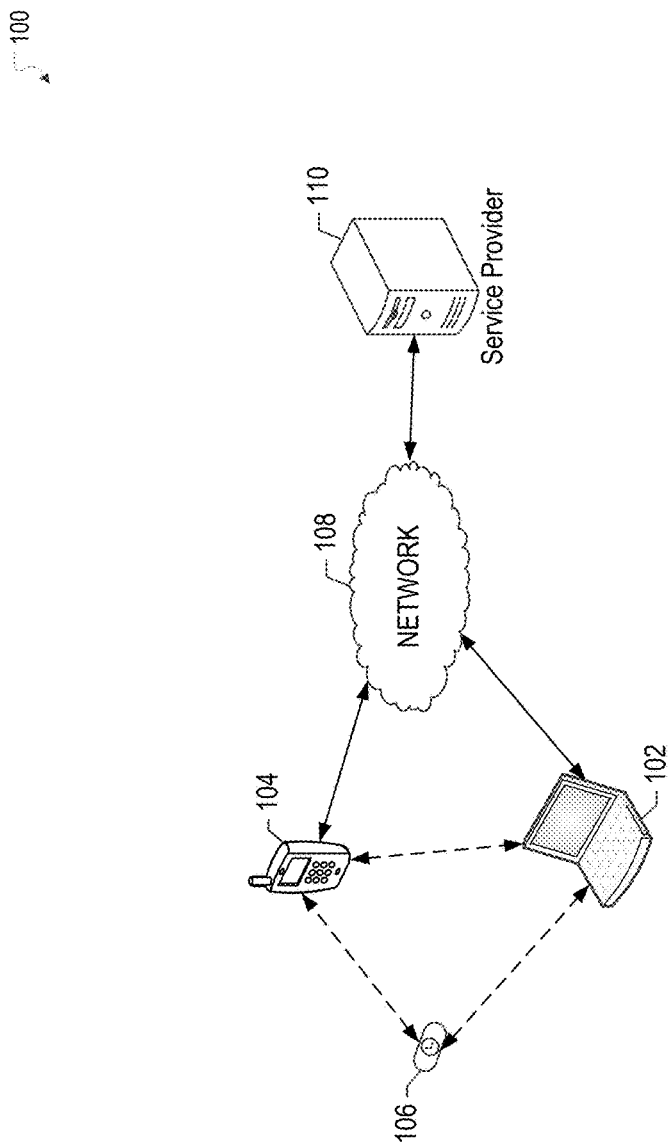
FIG. 1 illustrates an example network environment in which adaptive on-demand tethering may be implemented in accordance with one or more implementations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In some instances, structures and components are shown in block diagram form in order to avoid obscuring the concepts of the subject technology.

In the subject system for adaptive on-demand tethering, a local area connection, such as a Bluetooth connection, is used to transmit authentication and/or connection configuration information between proximal devices, such as a mobile phone and a laptop. After the authentication and/or connection configuration information has been exchanged between the devices, the devices may establish a tethering connection with each other (with either device having the Internet connection) on-demand, e.g. by transmission of a request or command over the local area connection (or other connection between the devices).

For example, the devices may individually monitor their connections to the Internet and when a device loses its connection to the Internet, or the device's connection drops below a configurable threshold, the device may initiate the tethering connection with the other device. The threshold may be based at least in part on, for example, a data rate, a bit error rate (BER), a received signal strength indicator (RSSI), or any indication of a slow, weak, and/or poor connection. Thus, a device implementing the subject system may adaptively establish on-demand tethering connections based at least in part on the strength and/or data rate of its own connection to the Internet (or lack thereof), and the strength and/or data rate of proximal devices' connections to the Internet.

In one or more implementations, the devices may utilize a security mechanism, such as a token exchange, to pre-authenticate with each other, such that the tethering connection may be pre-authenticated and established on-demand. For example, a user may separately log into a service provider account on each of the devices. The service provider may transmit a security token to each device that is locally stored at each device. The devices may then exchange the security tokens to authenticate with one another. Thus, the service provider allows a user to pre-authenticate an on-demand tethering connection between the user's devices using the user's account with the service provider.

In one or more implementations, either of the devices may be configurable to operate as the host device for any given tethering connection. In other words, the device that is requesting the tethering connection may be configured to operate as the host device for the tethering connection, and then route data traffic back through the device that is sharing the connection to the Internet. The devices may negotiate with one another when the on-demand tethering connection is established to determine which device will operate as the host device. For example, if one of the devices has less power available than the other device (e.g. due to a smaller battery, a discharged battery, and/or the other device being plugged in), the other device may operate as the host device for the tethering connection.

In one or more implementations, the devices may broadcast information regarding their connections to the Internet, such as using Bluetooth Low Energy (BLE) advertiser messages. A device may receive the connection information from another device and may adaptively initiate an on-demand tethering connection with the other device if the device's connection to the Internet is faster and/or stronger than its own. After the tethering connection is established, a tethered device may continually monitor its own connection to the Internet and may terminate the tethering connection when its own Internet connection is restored and/or satisfies a configurable threshold, such as a data rate threshold.

FIG. 1 illustrates an example network environment 100 in which adaptive on-demand tethering may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The example network environment 100 may include one or more electronic devices 102, 104, 106 that are directly or indirectly connected the network 108, as well as a service provider server 110 that is connected to the network 108. The electronic devices 102, 104, 106 may communicate with the service provider server 110 via the network 108. The network 108 may be a public communication network (such as the Internet, cellular data network, dialup modems over a telephone network) or a private communications network (such as private local area network ("LAN"), leased lines).

The service provider server 110 may be a single computing device such as a computer server, and/or the service provider server 110 may represent one or more computing devices (such as a cloud of computers and/or a distributed system) that are communicatively coupled, such as communicatively coupled over the network 108, that collectively, or individually, perform one or more functions that can be performed server-side. The service provider server 110 may be coupled with various databases, storage services, or other computing devices. The service provider server 110, and the coupled databases, storage services, or other computing devices may be geographically collocated, or may be disparately located. In one or more implementations, the service provider server 110 may be, or may include all or part of, the electronic system that is discussed further below with respect to FIG. 5.

The electronic devices 102, 104 and 106 can be computing devices such as laptop or desktop computers, smartphones, tablet computers, wearable devices, such as eyeglasses or watches that have one or more processors coupled thereto and/or embedded therein, televisions or other displays with one or more processors coupled thereto and/or embedded therein, or other appropriate computing devices that can be used to directly or indirectly connect to the network 108. In the example of FIG. 1, the electronic device 102 is depicted as a laptop computer, the electronic device 104 is depicted as a smart phone, and the electronic device 106 is depicted as a smart watch. In one or more implementations, one or more of the electronic devices 102, 104, 106 may be, or may include all or part of, the electronic system that is discussed further below with respect to FIG. 5.

One or more of the electronic devices 102, 104, 106 may include a wired and/or wireless network interface, such as a cellular network interface, a Wi-Fi network interface, etc., for establishing a network connection to the network 108. One or more of the electronic devices 102, 104, 106 may also include one or more local wireless interfaces, such as Bluetooth interface, a Bluetooth Low Energy (BLE) interface, a Zigbee interface, an infra-red interface, etc., for establishing local wireless connections the other electronic devices 102, 104, 106. The local wireless connections may be peer-to-peer network connections or infrastructure network connections.

In one or more implementations, one or more of the electronic devices 102, 104, 106 may utilize a local wireless connection as a tethering connection, e.g. to tether to the network connection of another of the electronic devices 102, 104, 106. A tethering connection allows one of the electronic devices 102, 104, 106, such as the electronic device 106, to connect to the network 108 through a network connection of another of the electronic devices 102, 104, 106, such as the electronic device 104. Thus, network traffic associated with the electronic device 106 is routed to/from the electronic device 104 over the tethering connection, and then routed to the network 108 via the network connection of the electronic device 104. During initiation of a tethering connection, one or more the electronic devices 102, 104, 106 may negotiate roles of the electronic devices 102, 104, 106 for the tethering connection, e.g. a host/server role and a client role, as is discussed further below with respect to FIG. 3.

As depicted in FIG. 1, the electronic device 104 is connected to the network 108 via a network connection, such as through a cellular network interface, and the electronic device 102 is connected to the network 108 via a network connection, such as through a Wi-Fi network interface. However, the electronic devices 102, 104 may also establish a tethering connection with one another and connect to the network 108 through each other's network connection via the tethering connection. Further as depicted in FIG. 1, the electronic device 106 does not have its own network connection to the network 108, but the electronic device 106 may establish one or more tethering connections with one or more of the electronic devices 102, 104, and connect to the network through the network connections of one or more of the electronic devices 102, 104 via the one or more tethering connections.

In the subject system, one or more of the electronic devices 102, 104, 106, such as the electronic device 102, may adaptively establish, on-demand, a tethering connection with another of the electronic devices 102, 104, 106 and connect to the network 108 through the network connection of another of the electronic devices 102, 104, 106 via the tethering connection. In order to facilitate the on-demand tethering, the electronic devices 102, 104, 106 may perform an initial pairing, and/or authentication, prior to forming the tethering connection, for example in conjunction with the service provider server 110, as is discussed further with respect to FIG. 3. In this manner, the electronic devices 102, 104, 106 may establish a tethering connection on-demand without any user intervention or user authentication at the time that the tethering connection is established.

In one or more implementations, one or more of the electronic devices 102, 104, 106 may monitor one or more attributes of their network connection to the network 108, such as a data rate associated with the network connection, a signal strength associated with the network connection, e.g. a received signal strength indicator (RSSI), a bit error rate associated with the network connection, and/or any other attribute that may be indicative of the quality of the network connection. The electronic devices 102, 104, 106 may broadcast the monitored attributes and/or information regarding the monitored attributes, such as via the local wireless interfaces. For example, the electronic devices 102, 104, 106 may transmit BLE advertiser messages that include information regarding the monitored attributes. In this manner, the electronic devices 102, 104, 106, when proximal to one another, may receive information regarding the attributes of the network connections of the other electronic devices 102, 104, 106, and may utilize the attributes to compare the quality of the network connections of the other electronic devices 102, 104, 106 to the quality of their own network connection.

When one of the electronic devices 102, 104, 106, such as the electronic device 102, determines that the quality of the network connection of another of the electronic devices 102, 104, 106, such as the electronic device 104, is preferable to the quality of its own network connection, and/or when the electronic device 102 does not have a network connection, the electronic device 102 may initiate an on-demand tethering connection with the electronic device 104 and connect to the network 108 through the network connection of the electronic device 104 via the tethering connection. In one or more implementations, if the electronic device 106 is connected to the network 108 through the network connection of the electronic device 102 via a tethering connection when the electronic device 102 initiates an on-demand tethering connection with the electronic device 104, the electronic device 102 may route the network traffic of the electronic device 106 to the network 108 through the network connection of the electronic device 104 via the tethering connections.

The electronic device 102 may continue to compare the quality/availability of its own network connection with the quality of the network connection of the electronic device 104, while connected to the network 108 through the network connection of the electronic device 104. The electronic device 102 may adaptively terminate the tethering connection, and reconnect to the network 108 via its own network connection, when the electronic device 102 determines that the quality of its own network connection has become preferable to the quality of the network connection of the electronic device 104, as is discussed further below with respect to FIG. 4. The electronic device 102 may also signal to the electronic device 104 when the tethering connection is being terminated, e.g. such that the electronic device 104 may tear down and/or disable the tethering connection on its end, thereby conserving power resources.

Figure 2:
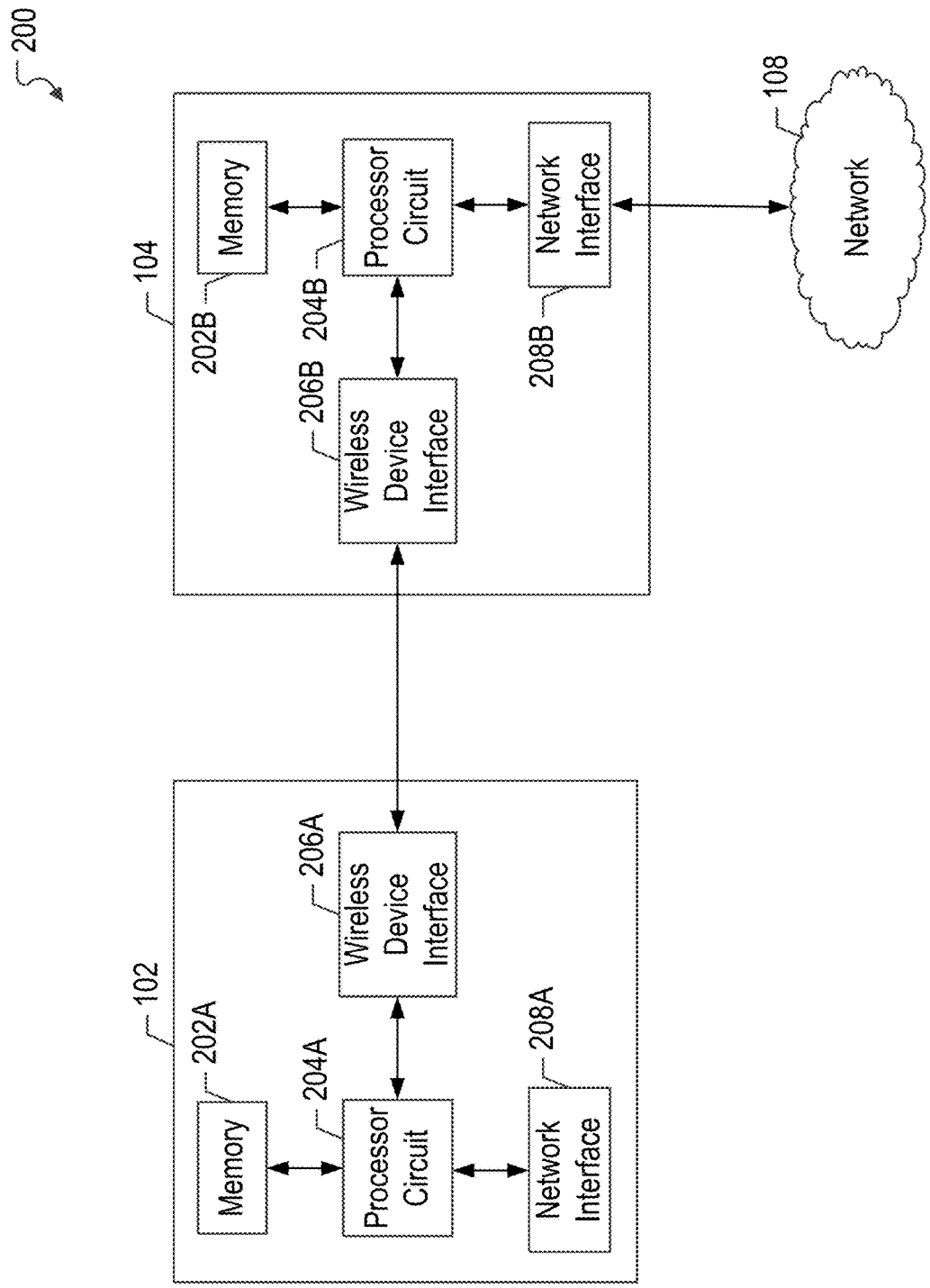
FIG. 2 illustrates an example network environment in which adaptive on-demand tethering may be implemented in accordance with one or more implementations.

FIG. 2 illustrates an example network environment 200 in which adaptive on-demand tethering may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

For explanatory purposes, the network environment 200 includes the electronic devices 102, 104 and the network 108. However, the network environment 200 may include one or more additional and/or alternative devices, such as the electronic device 106 and/or the service provider server 110. The electronic device 102 includes a memory 202A, a processor circuit 204A, a wireless device interface 206A, and a network interface 208A. The electronic device 104 includes a memory 202B, a processor circuit 204B, a wireless device interface 206B, and a network interface 208B.

The network interfaces 208A-B may be any network interface capable of establishing a network connection with the network 108, such as a cellular network interface, a Wi-Fi network interface and/or a wired network interface, e.g. Ethernet, Powerline, Multimedia over Coax Alliance (MoCA), etc. The wireless device interfaces 206A-B may be any interfaces capable of broadcasting messages and/or establishing a tethering connection between the electronic devices 102, 104, such as a Bluetooth interface, a BLE interface, a Wi-Fi interface, a Zigbee interface, an infra-red interface, etc. The electronic devices 102, 104 may broadcast information and/or receive broadcasted information via the wireless device interfaces 206A-B without having established a tethering connection, or other connection, via the wireless device interfaces 206A-B. In one or more implementations, the network interfaces 208A-B and/or the wireless device interfaces 206A-B may include one or more radios for wireless transmissions.

In the example of FIG. 2, the electronic device 104 is connected to the network 108 via a network connection established using the network interface 208B, such as a cellular network connection and/or a Wi-Fi network connection. The electronic devices 102, 104 have established a tethering connection via the wireless device interface 206A-B, and the electronic device 102 is connected to the network 108 through the network interface 208B of the electronic device 104 via the tethering connection, as the electronic device 102 does not have a network connection to the network 108 via the network interface 208A. In one or more implementations, the network connection of the electronic device 104 utilizes a first communication protocol, such as a cellular and/or Wi-Fi communication protocol, and the tethering connection utilizes a second communication protocol, such as a BLE, Bluetooth, or Zigbee communication protocol. In this instance, the electronic device 104 converts communications received using the first communication protocol to the second communication protocol, and vice-versa.

In one or more implementations, one or more of the memories 202A-B, the processor circuits 204A-B, the wireless device interfaces 206A-B, and/or the network interfaces 208A-B may be implemented in software (e.g., subroutines and code) and/or in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 3:
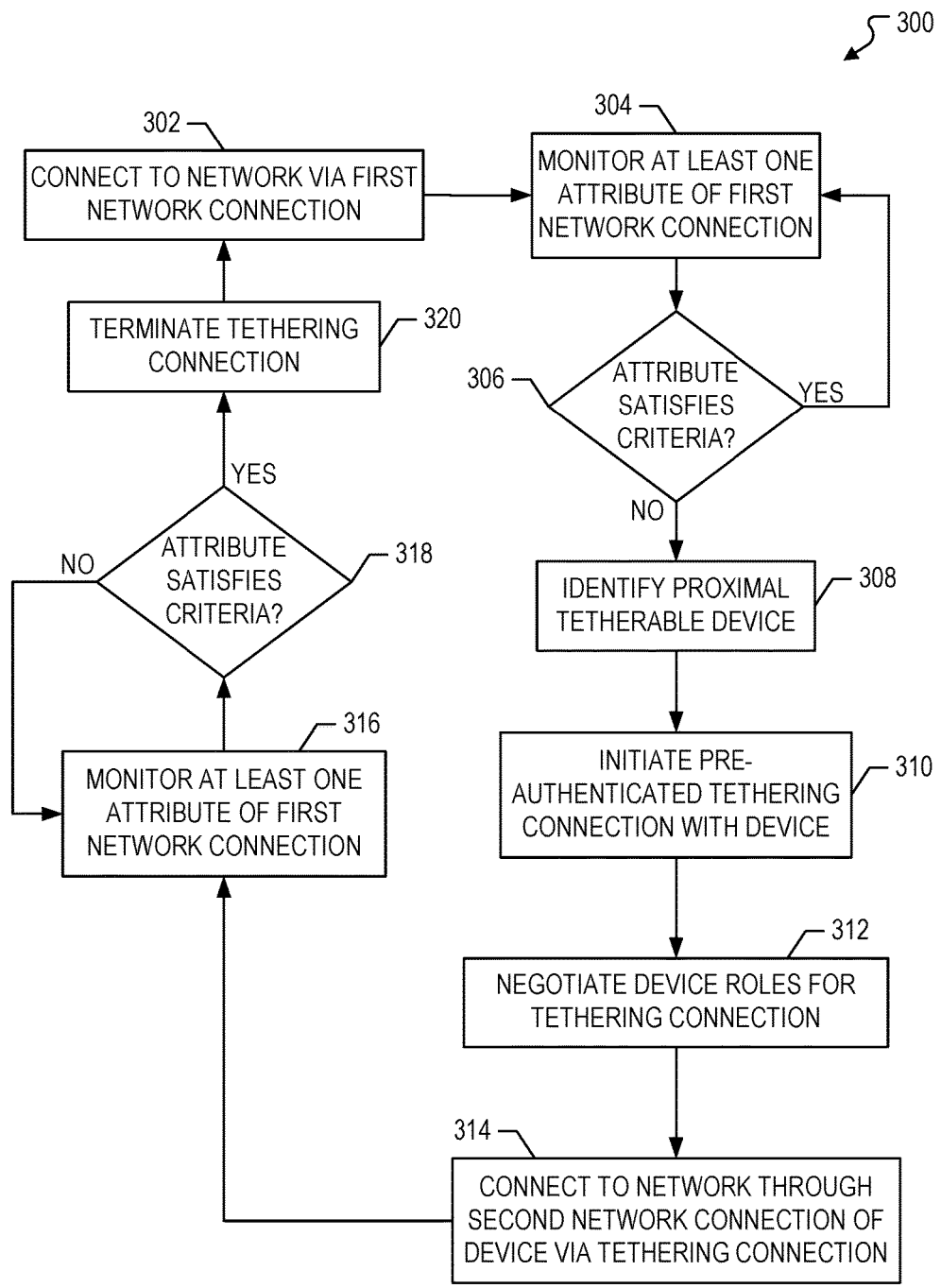
FIG. 3 illustrates an example process of an adaptive on-demand tethering system in accordance with one or more implementations.

FIG. 3 illustrates an example process 300 of an adaptive on-demand tethering system in accordance with one or more implementations. For explanatory purposes, the example process 300 is primarily described herein with reference to the electronic device 102 of FIGS. 1 and 2; however, the example process 300 is not limited to the electronic device 102 of FIGS. 1 and 2, and the example process 300 may be performed by one or more of the other electronic devices 104, 106, and/or one or more components of the electronic device 102, such as, for example, one or more of the processor circuit 204A, the wireless device interface 206A, and/or the network interface 208A. Further for explanatory purposes, the blocks of the example process 300 are described herein as occurring in serial, or linearly. However, multiple blocks of the example process 300 may occur in parallel. In addition, the blocks of the example process 300 may be performed a different order than the order shown and/or one or more of the blocks of the example process 300 may not be performed.

The electronic device 102 connects to the network 108, such as the Internet, via a network connection, such as a network connection established using the network interface 208A (302). The electronic device 102, such as via the processor circuit 204A, monitors at least one attribute of the network connection, e.g. a signal strength associated with the network connection, a bit error rate associated with the network connection, a data rate associated with the network connection, and/or any other attribute that may be indicative of a quality of the network connection (304).

The electronic device 102 determines whether the monitored attributed satisfies one or more criteria (306). The one or more criteria may include, for example, a minimum signal strength level, a minimum bit error rate, a minimum data rate, a maximum billing amount, and/or a maximum data usage for a period of time, such as a data quota. In one or more implementations, the monitored attribute may not satisfy the one or more criteria when the network connection becomes disconnected or otherwise unavailable. In one or more implementations, the monitored attribute may not satisfy the one or more criteria when a maximum data usage and/or a maximum billing amount associated with the network connection has been reached. For example, the network connection may be facilitated by a third party provider, such as a mobile carrier, which may charge fees based on data usage and/or when a maximum data usage for a particular period of time, e.g. a month, a year, etc., has been reached. If the electronic device 102 determines that the at least one attribute satisfies the one or more criteria (306), the electronic device 102 continues to monitor the at least one attribute (304).

If the electronic device 102 determines that the at least one attribute does not satisfy the one or more criteria (306), the electronic device 102 identifies a proximal electronic device 104 that is adaptively tetherable on-demand (308). In one or more implementations, the electronic device 102 may identify the proximal electronic device 104 based at least in part on messages broadcast by the electronic device 104, such as via the wireless device interface 206B. The messages may include, for example, a device address of the electronic device 104, such as a media access control (MAC) address, and one or more attributes and/or connection quality values associated with the network connection of the electronic device 104. The electronic device 102 may compare the device address of the electronic device 104 to a list of pre-authenticated device addresses to determine whether the electronic device 104 is adaptively tetherable on-demand.

In one or more implementations, the electronic devices 102, 104 may authenticate through a service that is provided by the service provider server 110. For example, a user may login into an account with the service provider server 110 on each of the electronic devices 102, 104, and the service provider server 110 may then provide security tokens to each of the electronic devices 102, 104. The electronic devices 102, 104 may exchange the security tokens with one another, for example during a pairing process, and may then add each other's device address to a list of pre-authenticated device addresses. Thus, the electronic device 102 may initiate a pre-authenticated tethering connection with the electronic device 104 by transmitting a message to the electronic device 104, such as via the wireless device interface 206A, that includes the device address of the electronic device 102 (310).

The electronic device 102 negotiates with the electronic device 104 to determine the roles of the electronic devices 102, 104 for the tethering connection (312). For example, one of the electronic devices 102, 104 may operate as the host device for the tethering connection while the other electronic device may operate as the client device for the tethering connection. The designation of the host device and the client device for the tethering connection may be independent of which of the electronic devices 102, 104 has the network connection that is being shared. For example, the electronic devices 102, 104 may determine which of the electronic devices 102, 104 is better situated to operate as the host device, such as based on available power, processing, and/or memory resources.

In the instance of a Wi-Fi hotspot tethering connection, the host device may configure and create an access point, and may transmit information for accessing the Wi-Fi hotspot, such as a service set identification (SSID) and/or password, to the client device, such as via the wireless device interfaces 206A-B. In one or more implementations, the SSID and/or password may be randomly generated. The client device may then connect to the Wi-Fi hotspot to form the tethering connection. Since the host device has to maintain the access point, the host device may experience a greater power consumption than the client device. Thus, in the example of a Wi-Fi hotspot tethering connection, the one of the electronic devices 102, 104 that has greater power resources available may be better situated to operate as the host device. In one or more implementations, the host device may implement one or more power saving schemes, such as Wi-Fi Direct group power save modes (notice of absence), and/or custom power save mode schemes, such as issue congestion notice, go to sleep.

After the roles of the electronic devices 102, 104 have been negotiated and the tethering connection has been formed, the electronic device 102 connects to the network 108 through a second network connection of the electronic device 104 via the tethering connection (314). The electronic device 102 continues to monitor at least one attribute of the first network connection of the electronic device 102 while connected to the network 108 via the second network connection of the electronic device 104 (316).

The electronic device 102 determines whether the monitored attribute of the first network connection satisfies one or more criteria while the electronic device 102 is connected to the network 108 via the second network connection (318). In one or more implementations, if the electronic device 102 previously lost its network connection to the network 108 entirely, the at least one attribute may indicate whether the network connection has been restored. In one or more implementations, if the data usage of the electronic device 102 exceeded a maximum data usage and/or a maximum billing amount for a period of time, the at least one attribute may satisfy the one or more criteria when the billing cycle resets, thereby resetting the data usage and/or billing amount. If the electronic device 102 determines that the at least one attribute of the first network connection satisfies the one or more criteria (318), the electronic device 102 terminates the tethering connection with the electronic device 104 (320) and connects to the network 108 via the first network connection (302). In one or more implementations, the electronic device 102 may transmit a message to the electronic device 104 indicating that the tethering connection is being terminated. In this manner, the electronic device 104 may adaptively tear-down or disable the tethering connection, if the tethering connection is not being used by any other devices.

If the electronic device 102 determines that the at least one attribute of the first network connection does not satisfy the one or more criteria (318), the electronic device 102 continues to monitor the at least one attribute of the first network connection while connected to the network 108 through the second network connection of the electronic device 104 (316).

Figure 4:
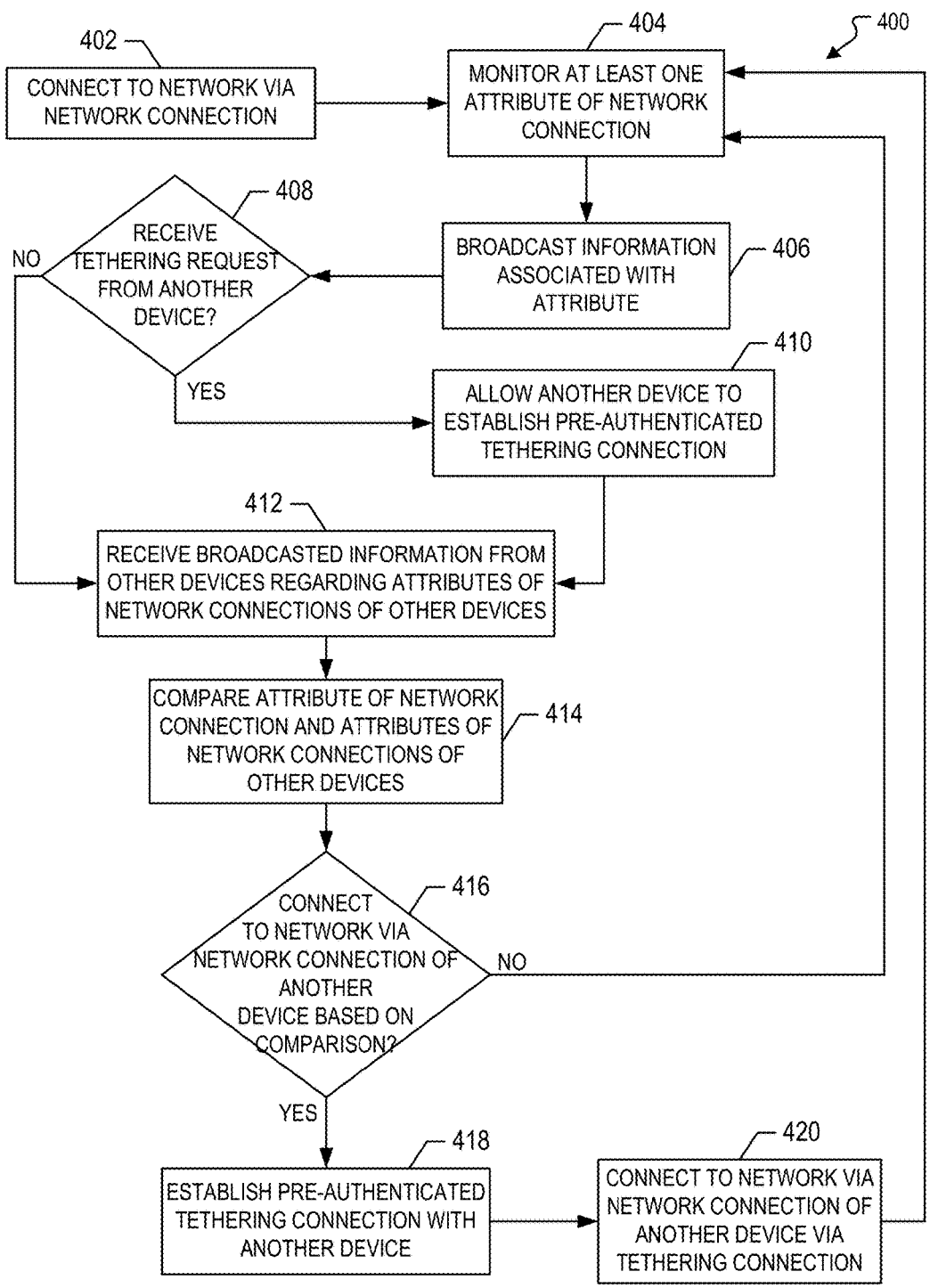
FIG. 4 illustrates an example process of an adaptive on-demand tethering system in accordance with one or more implementations.

FIG. 4 illustrates an example process 400 of an adaptive on-demand tethering system in accordance with one or more implementations. For explanatory purposes, the example process 400 is primarily described herein with reference to the electronic device 102 of FIGS. 1 and 2; however, the example process 400 is not limited to the electronic device 102 of FIGS. 1 and 2, and the example process 400 may be performed by one or more of the other electronic devices 104, 106, and/or one or more components of the electronic device 102, such as, for example, one or more of the processor circuit 204A, the wireless device interface 206A, and/or the network interface 208A. Further for explanatory purposes, the blocks of the example process 400 are described herein as occurring in serial, or linearly. However, multiple blocks of the example process 400 may occur in parallel. In addition, the blocks of the example process 400 may be performed a different order than the order shown and/or one or more of the blocks of the example process 400 may not be performed.

The electronic device 102 connects to the network 108, such as the Internet, via a network connection, such as a network connection established using the network interface 208A (402). The electronic device 102, such as via the processor circuit 204A, monitors at least one attribute of the network connection, e.g. a signal strength associated with the network connection, a bit error rate associated with the network connection, a data rate associated with the network connection, and/or any other attribute that may be indicative of a quality of the network connection (404).

The electronic device 102 broadcasts information associated with the monitored attribute, such as one or more connection quality values determined in relation to the monitored attribute (406). In one or more implementations, a connection quality value may be indicative of a quality of the network connection, such as a signal strength value, a bit error rate value, a data rate value, etc. In one or more implementations, the electronic device 102 may broadcast the information associated with the monitored attribute via the wireless device interface 206A, such as using BLE advertiser messages.

The electronic device 102 determines whether a tethering request has been received from another electronic device, such as the electronic device 106 (408), for example in the form of a message that includes a device address of the electronic device 106. If the electronic device 102 determines that a tethering request has been received from another electronic device 106 (408), the electronic device 102 confirms that the requesting electronic device 106 has been pre-authenticated and then allows the electronic device 106 to establish a pre-authenticated tethering connection, such as via the wireless device interface 206A (410). The electronic device 102 then routes network traffic associated with the electronic device 106 to/from the network 108 through the network connection via the tethering connection.

The electronic device 102 receives broadcasted information from other electronic devices 104, 106 regarding attributes of the network connections of the other electronic devices 104,106, such as connection quality values associated with the network connections of the other electronic devices 104, 106 (412). In one or more implementations, the broadcasted information may include a device address of the electronic device that is broadcasting the information. In one or more implementations, the electronic device 102 may receive the broadcasted information via the wireless device interface 206A, while a tethering connection is established with the electronic device 106 via the wireless device interface 206A. In one or more implementations, the electronic device 106 may include an additional wireless device interface that may be used to receive the broadcasted information while the tethering connection is established with the electronic device 106.

The electronic device 102 compares the attribute of its own network connection to received attributes regarding the network connections of other electronic devices 104, 106 (414). The electronic device 102 determines whether to establish a pre-authenticated tethering connection with one of the other electronic devices 104, 106, such as the electronic device 104, and connect to the network 108 via the network connection of the other electronic device 104, based at least in part on the comparison (416). For example, if the received information includes a signal strength value and/or data rate value corresponding to the network connection of the electronic device 104 that exceeds the signal strength value and/or data rate value of the network connection of the electronic device 102, such as by more than a threshold amount, the electronic device 102 may establish a pre-authenticated tethering connection with the electronic device 104 (416). The electronic device 102 then connects to the network 108 through the network connection of the electronic device 104 via the tethering connection (420), and may continue to monitor the at least one attribute of its own network connection (404).

In one or more implementations, if the electronic device 106 has a tethering connection established with the electronic device 102 (410) when the electronic device 102 establishes the tethering connection with the electronic device 104 (418) and connects to the network 108 through the network connection of the electronic device 104 (420), the electronic device 102 also routes the data traffic associated with the electronic device 106 to the network 108 through the network connection of the electronic device 104 via the tethering connection with the electronic device 104. Thus, the electronic device 106 may access the network connection of the electronic device 104 via the tethering connection between the electronic device 106 and the electronic device 102 and the tethering connection between the electronic device 102 and the electronic device 104. In one or more implementations, the electronic device 102 may establish two simultaneous tethering connections using the wireless device interface 206A and/or the electronic device 104 may include another wireless device interface to support the second tethering connection, e.g. using a different communication protocol than the first tethering connection.

In one or more implementations, users of the electronic devices 102, 104, 106 may opt-in to report the information regarding the attributes of their network connections and/or their locations to the service provider server 110. The service provider server 110 may then notify an electronic device 102 when a proximal electronic device 104 has a preferable network connection than the electronic device 102. The electronic device 102 may receive the notification and may initiate a tethering connection with the electronic device 104 in response to the notification.

Figure 5:
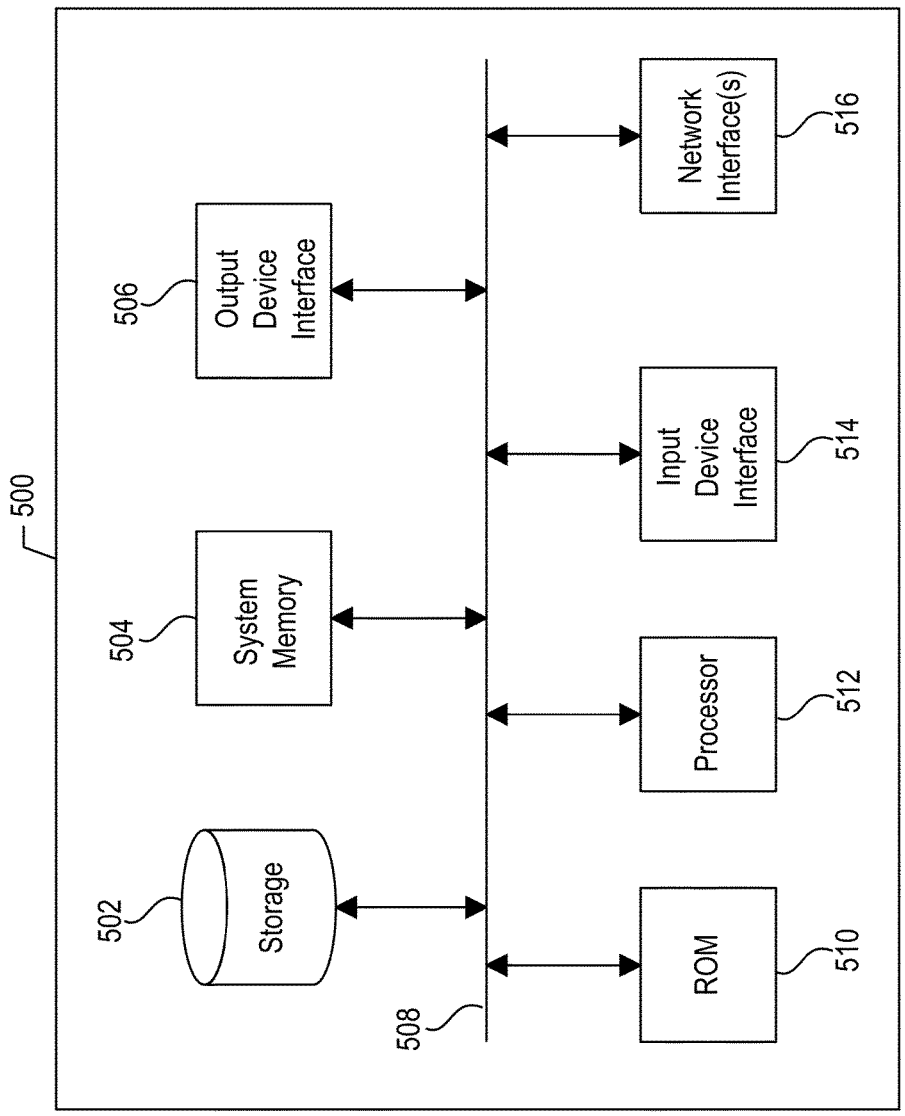
FIG. 5 conceptually illustrates an electronic system with which one or more implementations of the subject technology may be implemented.

FIG. 5 conceptually illustrates electronic system 500 with which any implementations of the subject technology may be implemented. Electronic system 500, for example, can be a desktop computer, a laptop computer, a tablet computer, a server, a receiver, a phone, or generally any electronic device. Such an electronic system 500 includes various types of computer readable media and interfaces for various other types of computer readable media. Electronic system 500 includes bus 508, processing unit(s) 512, system memory 504, read-only memory (ROM) 510, permanent storage device 502, input device interface 514, output device interface 506, and one or more network interfaces 516, or subsets and variations thereof.

Bus 508 collectively represents all system, peripheral, and chipset buses that communicatively connect the numerous internal devices of electronic system 500. In one or more implementations, bus 508 communicatively connects processing unit(s) 512 with ROM 510, system memory 504, and permanent storage device 502. From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. One or more implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such as random access memory. System memory 504 stores any of the instructions and data that processing unit(s) 512 needs at runtime. In one or more implementations, the processes of the subject disclosure are stored in system memory 504, permanent storage device 502, and/or ROM 510. From these various memory units, processing unit(s) 512 retrieves instructions to execute and data to process in order to execute the processes of one or more implementations.

Bus 508 also connects to input and output device interfaces 514 and 506. Input device interface 514 enables a user to communicate information and select commands to the electronic system. Input devices used with input device interface 514 include, for example, alphanumeric keyboards and pointing devices (also called "cursor control devices"). Output device interface 506 enables, for example, the display of images generated by electronic system 500. Output devices used with output device interface 506 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 5, bus 508 also couples electronic system 500 to a network (not shown) through one or more network interfaces 516. In this manner, the computer can be a part of a network of computers (such as a local area network ("LAN"), a wide area network ("WAN"), or an Intranet, or a network of networks, such as the Internet. In one or more implementations, the electronic system 500 may include a first network interface 516 for forming a network connection to a network and a second network interface 516 for forming a tethering connection with another device. The electronic system 500 may bridge the network connection and the tethering connection to connect the other device to the network via the one or more network interfaces 516. Any or all components of electronic system 500 can be used in conjunction with the subject disclosure.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra-density optical discs, any other optical or magnetic media, and floppy disks. In one or more implementations, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more implementations, the computer readable media is non-transitory computer readable media, computer readable storage media, or non-transitory computer readable storage media.

In one or more implementations, a computer program product (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A computer-implemented method for adaptive on-demand tethering, the method comprising:
connecting to a network via a first network connection;
monitoring at least a first attribute of the first network connection;
exchanging, with a proximal device, authentication information received from a service provider;
initiating a tethering connection with the proximal device based at least in part on the monitoring of the first attribute and the exchanging;
determining, in conjunction with the proximal device, whether the proximal device will operate as a host device or a client device for the tethering connection;
creating a first wireless network to be connected to by the proximal device for the tethering connection when the proximal device is determined to operate as the client device for the tethering connection, otherwise connecting to a second wireless network created by the proximal device for the tethering connection when the proximal device is determined to operate as the host device for the tethering connection; and
connecting to the network through a second network connection of the proximal device via the tethering connection based at least in part on the monitoring of the first attribute.

2. The method of claim 1, wherein initiating the tethering connection with the proximal device based at least in part on the monitoring of the first attribute comprises initiating the tethering connection with the proximal device over a local wireless connection when the first attribute of the first network connection fails to satisfy one or more criteria.

3. The method of claim 2, wherein exchanging, with the proximal device, the authentication information received from the service provider further comprises:
exchanging the authentication information received from the service provider and connection configuration information for the tethering connection with the proximal device over the local wireless connection prior to monitoring the first attribute of the first network connection.

4. The method of claim 3, further comprising:
authenticating with the service provider via the network; and
receiving the authentication information from the service provider prior to exchanging the authentication information received from the service provider with the proximal device, the authentication information received from the service provider being different than another authentication information received from the proximal device during the exchanging.

5. The method of claim 3, wherein the local wireless connection comprises a Bluetooth connection that is separate from the first network connection and the network comprises an Internet.

6. The method of claim 2, further comprising:
receiving, from the proximal device via the local wireless connection, a second attribute of the second network connection; and
initiating the tethering connection with the proximal device when the first attribute of the first network connection fails to satisfy the one or more criteria and the second attribute of the second network connection satisfies the one or more criteria.

7. The method of claim 2, further comprising:
monitoring the first attribute of the first network connection while connected to the network through the second network connection of the proximal device via the tethering connection;
terminating the tethering connection when the first attribute of the first network connection satisfies the criteria; and
reconnecting to the network via the first network connection when the first attribute of the first network connection satisfies the criteria.

8. The method of claim 2, wherein the first attribute of the first network connection comprises at least one of: a signal strength, a data rate, a bit error rate, a data usage, or a billing amount associated with the first network connection, and the one or more criteria comprises at least one of a minimum signal strength, a minimum data rate, a minimum bit error rate, a maximum data usage, or a maximum billing amount.

9. The method of claim 1, wherein the proximal device is determined to operate as the client device for the tethering connection.

10. A device comprising:
a wireless interface for establishing a tethering connection; and
at least one processor circuit configured to:
monitor at least a first connection quality value associated with a first network connection of the device to a network;
exchange, with another device, authentication information received from a service provider;
receive information regarding a second connection quality value associated with a second network connection of the another device;
initiate, via the wireless interface, a lithe tethering connection with the another device based at least in part on the exchange and a comparison of the first connection quality value to the second connection quality value;
connect to the network through the second network connection of the another device via the tethering connection based at least in part on the comparison;
maintain the first network connection and monitor the first connection quality value and the second connection quality value while connected to the network through the second network connection; and
reconnect to the network through the first network connection based at least in part on another comparison of the first connection quality value and the second connection quality value.

11. The device of claim 10, wherein the at least one processor circuit is further configured to:
terminate the tethering connection with the another device based at least in part on the another comparison of the first connection quality value and the second connection quality value prior to reconnecting to the network through the first network connection.

12. The device of claim 10, wherein the authentication information comprises pre-authenticated security tokens and the at least one processor circuit is further configured to, during initiation of the tethering connection:
    determine roles of the device and the another device for the tethering connection.

13. The device of claim 10, wherein the first network connection is established utilizing a first communication protocol and the information regarding the second connection quality value is received utilizing a second communication protocol.

14. The device of claim 13, wherein the at least one processor circuit is further configured to:
    broadcast the first connection quality value utilizing the second communication protocol.

15. The device of claim 14, wherein the at least one processor circuit is further configured to:
    receive, in response to the broadcast, a request to initiate another tethering connection from an additional device; and
    connect the additional device to the network through the first network connection via the another tethering connection.

16. The device of claim 10, wherein the at least one processor circuit is further configured to route network traffic to the network through the second network connection of the another device via the tethering connection.

17. The device of claim 10, further wherein the at least one processor
    circuit is further configured to:
    initiate the tethering connection with the another device when the second connection quality value exceeds the first connection quality value.

18. A non-transitory machine readable medium embodying instructions that, when executed by a machine, cause the machine to perform a method comprising:
    connecting to a network via a first network connection;
    monitoring at least a first attribute of the first network connection;
    exchanging, with a proximal device, authentication information received from a service provider;
    initiating a tethering connection with the proximal device based at least in part on the monitoring of the first attribute and the exchanging;
    determining, in conjunction with the proximal device, whether the proximal device will operate as a host device or a client device for the tethering connection;
    creating a first wireless network to be connected to by the proximal device for the tethering connection when the proximal device is determined to operate as the client device for the tethering connection, otherwise connecting to a second wireless network created by the proximal device for the tethering connection when the proximal device is determined to operate as the host device for the tethering connection; and
    connecting to the network through a second network connection of the proximal device via the tethering connection based at least in part on the monitoring of the first attribute.

19. The non-transitory machine readable medium of claim 18, wherein the first network connection utilizes a first communication protocol and the tethering connection utilizes the a second communication protocol that is different than the first communication protocol.

20. The non-transitory machine readable medium of claim 18, wherein the authentication information comprises pre-authenticated security tokens.

* * * * *